(12) United States Patent
El Emam et al.

(10) Patent No.: US 8,316,054 B2
(45) Date of Patent: Nov. 20, 2012

(54) RE-IDENTIFICATION RISK IN DE-IDENTIFIED DATABASES CONTAINING PERSONAL INFORMATION

(75) Inventors: Khaled El Emam, Ottawa, CA (US); Fida Dankar, Ottawa, CA (US)

(73) Assignee: University of Ottawa, Ottawa, Ontario (CA)

( * ) Notice: Subject to any disclaimer, the term of this patent is extended or adjusted under 35 U.S.C. 154(b) by 208 days.

(21) Appl. No.: 12/564,687

(22) Filed: Sep. 22, 2009

(65) Prior Publication Data

US 2010/0077006 A1  Mar. 25, 2010

Related U.S. Application Data (60) Provisional application No. 61/099,054, filed on Sep. 22, 2008.

(51) Int. Cl.
G06F 7/00 (2006.01)
G06F 17/00 (2006.01)
G06F 17/30 (2006.01)
G06F 11/30 (2006.01)

(52) U.S. Cl. .................. 707/785; 707/788; 713/189
(58) Field of Classification Search .................. 713/190, 713/200; 707/899; 705/74
See application file for complete search history.

(56) References Cited

U.S. PATENT DOCUMENTS

| 6,941,463 | B1 * | 9/2005 | Atallah et al. ................. 713/190 |
| 7,269,578 | B2 * | 9/2007 | Sweeney .......................... 705/74 |
| 7,475,085 | B2 * | 1/2009 | Aggarwal et al. ..................... 1/1 |
| 2004/0199781 | A1 * | 10/2004 | Erickson et al. .............. 713/200 |
| 2007/0192139 | A1 * | 8/2007 | Cookson et al. .................. 705/3 |

\* cited by examiner

*Primary Examiner* — Susan Chen
(74) *Attorney, Agent, or Firm* — Garvey, Smith, Nehrbass & North, L.L.C.; Brett A. North (57) ABSTRACT

A system and method of performing risk assessment of a dataset de-identified from a source database containing information identifiable to individuals is provided. The de-identified dataset is retrieved comprising a plurality of records from a storage device. A selection of variables from a user is received, the selection made from a plurality of variables present in the dataset, wherein the variables are potential identifiers of personal information. A selection of a risk threshold acceptable for the dataset from a user is received. A selection of a sampling fraction wherein the sampling fraction define a relative size of their dataset to an entire population is received. A number of records from the plurality of records for each equivalence class in the identification dataset for each of the selected variables. A re-identification risk using the selected sampling fraction is calculated. The re-identification risk meets the selected risk threshold is determined.

18 Claims, 10 Drawing Sheets

Original Database to Disclose (310)

| ID | IDENTIFYING VARIABLE | QUASI-IDENTIFIERS | | Test Result |
|---|---|---|---|---|
| | Name | Gender | Year of Birth | |
| 1 | John Smith | Male | 1959 | +ve |
| 2 | Alan Smith | Male | 1962 | -ve |
| 3 | Alice Brown | Female | 1955 | -ve |
| 4 | Hercules Green | Male | 1959 | -ve |
| 5 | Alicia Freds | Female | 1940 | +ve |
| 6 | Gill Stinger | Female | 1975 | -ve |
| 7 | Marie Kirkpatrick | Female | 1966 | -ve |
| 8 | Leslie Hall | Female | 1987 | -ve |
| 9 | Bill Nash | Male | 1975 | -ve |
| 10 | Albert Blackwell | Male | 1978 | +ve |
| 11 | Beverly McCulsky | Female | 1964 | +ve |
| 12 | Douglas Henry | Male | 1959 | -ve |
| 13 | Freda Shields | Female | 1975 | -ve |
| 14 | Fred Thompson | Male | 1967 | -ve |

2-Anonymization →

Disclosed (k-Anonymized) Database (c) (320)

| ID | QUASI-IDENTIFIERS | | Test Result |
|---|---|---|---|
| | Gender | Decade of Birth | |
| 1 | Male | 1950-1959 | +ve |
| 2 | Male | 1960-1969 | -ve |
| 4 | Male | 1950-1959 | -ve |
| 6 | Female | 1970-1979 | -ve |
| 7 | Female | 1960-1969 | -ve |
| 9 | Male | 1970-1979 | -ve |
| 10 | Male | 1970-1979 | +ve |
| 11 | Female | 1960-1969 | +ve |
| 12 | Male | 1950-1959 | -ve |
| 13 | Female | 1970-1979 | -ve |
| 14 | Male | 1960-1969 | -ve |

Matching ↕

Identification Database (Z) (330)

| ID | IDENTIFYING VARIABLE | QUASI-IDENTIFIERS | |
|---|---|---|---|
| | Name | Gender | Year of Birth |
| 1 | John Smith | Male | 1959 |
| 2 | Alan Smith | Male | 1962 |
| 3 | Alice Brown | Female | 1955 |
| 4 | Hercules Green | Male | 1959 |
| 5 | Alicia Freds | Female | 1940 |
| 6 | Gill Stinger | Female | 1975 |
| 7 | Marie Kirkpatrick | Female | 1966 |
| 8 | Leslie Hall | Female | 1987 |
| 9 | Bill Nash | Male | 1975 |
| 10 | Albert Blackwell | Male | 1978 |
| 11 | Beverly McCulsky | Female | 1964 |
| 12 | Douglas Henry | Male | 1959 |
| 13 | Freda Shields | Female | 1975 |
| 14 | Fred Thompson | Male | 1967 |
| 15 | Joe Doe | Male | 1961 |
| 16 | Mark Fractus | Male | 1974 |
| 17 | Lillian Bailey | Female | 1978 |
| 18 | Jane Doe | Female | 1961 |
| 19 | Nina Brown | Female | 1968 |
| 20 | William Cooper | Male | 1973 |
| 21 | Kathy Last | Female | 1966 |
| 22 | Dietmar Plank | Male | 1967 |
| 23 | Anderson Hoyt | Male | 1971 |
| 24 | Alexandra Knight | Female | 1974 |
| 25 | Helene Arnold | Female | 1977 |
| 26 | Anderson Heft | Male | 1968 |
| 27 | Almond Zipf | Male | 1954 |
| 28 | Alex Long | Female | 1952 |
| 29 | Britney Goldman | Female | 1956 |
| 30 | Lisa Marie | Female | 1988 |
| 31 | Natasha Markhov | Female | 1941 |

RE-IDENTIFICATION RISK IN DE-IDENTIFIED DATABASES CONTAINING PERSONAL INFORMATION

CROSS-REFERENCE TO RELATED APPLICATIONS

This application claims priority from U.S. Application No. 61/099,054 filed Sep. 22, 2008 which is hereby incorporated by reference.

TECHNICAL FIELD

The present invention relates to databases and particularly to systems and methods to protecting privacy by de-identification of personal data stored in the databases.

BACKGROUND

Personal information is being continuously captured in a multitude of electronic databases. Details about health, financial status and buying habits are stored in databases managed by public and private sector organizations. These databases contain information about millions of people, which can provide valuable research, epidemiologic and business insight. For example, examining a drugstore chain's prescriptions can indicate where a flu outbreak is occurring. To extract or maximize the value contained in these databases, data custodians must often provide outside organizations access to their data. In order to protect the privacy of the people whose data is being analyzed, a data custodian will "de-identify" information before releasing it to a third-party. An important type of de-identification ensures that data cannot be traced to the person about whom it pertains, this protects against 'identity disclosure'.

When de-identifying records, many people assume that removing names and addresses (direct identifiers) is sufficient to protect the privacy of the persons whose data is being released. The problem of de-identification involves those personal details that are not obviously identifying. These personal details, known as quasi-identifiers, include the person's age, sex, postal code, profession, ethnic origin and income (to name a few).

Data de-identification is currently a manual process. Heuristics are used to make a best guess about how to remove identifying information prior to releasing data. Manual data de-identification has resulted in several cases where individuals have been re-identified in supposedly anonymous datasets. One popular anonymization approach is k-anonymity. There have been no evaluations of the actual re-identification probability of k-anonymized data sets and datasets are being released to the public without a full understanding of the vulnerability of the dataset.

Accordingly, systems and methods that enable improved risk identification and mitigation for data sets remain highly desirable.

BRIEF DESCRIPTION OF THE DRAWINGS

Further features and advantages of the present invention will become apparent from the following detailed description, taken in combination with the appended drawings, in which:

FIG. 3 shows original database, an anonymized database and identification database;

It will be noted that throughout the appended drawings, like features are identified by like reference numerals.

SUMMARY

In accordance with an aspect of the present disclosure there is provided a method of performing risk assessment of a dataset de-identified from a source database containing information identifiable to individuals. The method comprising: retrieving the de-identified dataset comprising a plurality of records from a storage device; receiving a selection of variables from a user, the selection made from a plurality of variables present in the dataset, wherein the variables are potential identifiers of personal information; receiving a selection of a risk threshold acceptable for the dataset from a user; receiving a selection of a sampling fraction wherein the sampling fraction define a relative size of their dataset to an entire population; determining a number of records from the plurality of records for each equivalence class in the identification dataset for each of the selected variables; calculating a re-identification risk using the selected sampling fraction; and determining if the re-identification risk meets the selected risk threshold.

In accordance with an aspect of the present disclosure there is provided a system for performing risk assessment of a data set. The system comprising: a processor a memory containing instructions for execution by the processor, the instructions comprising: retrieving the de-identified dataset comprising a plurality of records from a storage device; receiving a selection of variables from a user, the selection made from a plurality of variables present in the dataset, wherein the variables are potential identifiers of personal information; receiving a selection of a risk threshold acceptable for the dataset from a user; receiving a selection of a sampling fraction wherein the sampling fraction define a relative size of their dataset to an entire population; determining a number of records from the plurality of records for each equivalence class in the identification dataset for each of the selected variables; calculating a re-identification risk using the selected sampling fraction; and determining if the re-identification risk meets the selected risk threshold.

In accordance with an aspect of the present disclosure there is provided a computer readable memory containing instructions for execution on a processor. The instructions comprising: retrieving the de-identified dataset comprising a plurality of records from a storage device; receiving a selection of variables from a user, the selection made from a plurality of variables present in the dataset, wherein the variables are potential identifiers of personal information; receiving a selection of a risk threshold acceptable for the dataset from a user; receiving a selection of a sampling fraction wherein the sampling fraction define a relative size of their dataset to an entire population; determining a number of records from the plurality of records for each equivalence class in the identification dataset for each of the selected variables; calculating a re-identification risk using the selected sampling fraction; and determining if the re-identification risk meets the selected risk threshold.

DETAILED DESCRIPTION

Embodiments are described below, by way of example only, with reference to FIGS. 1-10.

When datasets are released containing personal information, potential identification information is removed to minimize the possibility of re-identification of the information. However there is a fine balance between removing information that may potentially lead to identification of the personal data stored in the database versus the value of the database itself. A commonly used criterion for assessing re-identification risk is k-anonymity. With k-anonymity an original data set containing personal information can be transformed so that it is difficult for an intruder to determine the identity of the individuals in that data set. A k-anonymized data set has the property that each record is similar to at least another k−1 other records on the potentially identifying variables. For example, if k=5 and the potentially identifying variables are age and gender, then a k-anonymized data set has at least 5 records for each value combination of age and gender. The most common implementations of k-anonymity use transformation techniques such as generalization, and suppression.

Any record in a k-anonymized data set has a maximum probability 1/k of being re-identified. In practice, a data custodian would select a value of k commensurate with the re-identification probability they are willing to tolerate—a threshold risk. Higher values of k imply a lower probability of re-identification, but also more distortion to the data, and hence greater information loss due to k-anonymization. In general, excessive anonymization can make the disclosed data less useful to the recipients because some analysis becomes impossible or the analysis produces biased and incorrect results.

Ideally, the actual re-identification probability of a k-anonymized data set would be close to 1/k since that balances the data custodian's risk tolerance with the extent of distortion that is introduced due to k-anonymization. However, if the actual probability is much lower than 1/k then k-anonymity may be over-protective, and hence results in unnecessarily excessive distortions to the data.

Figure 1:
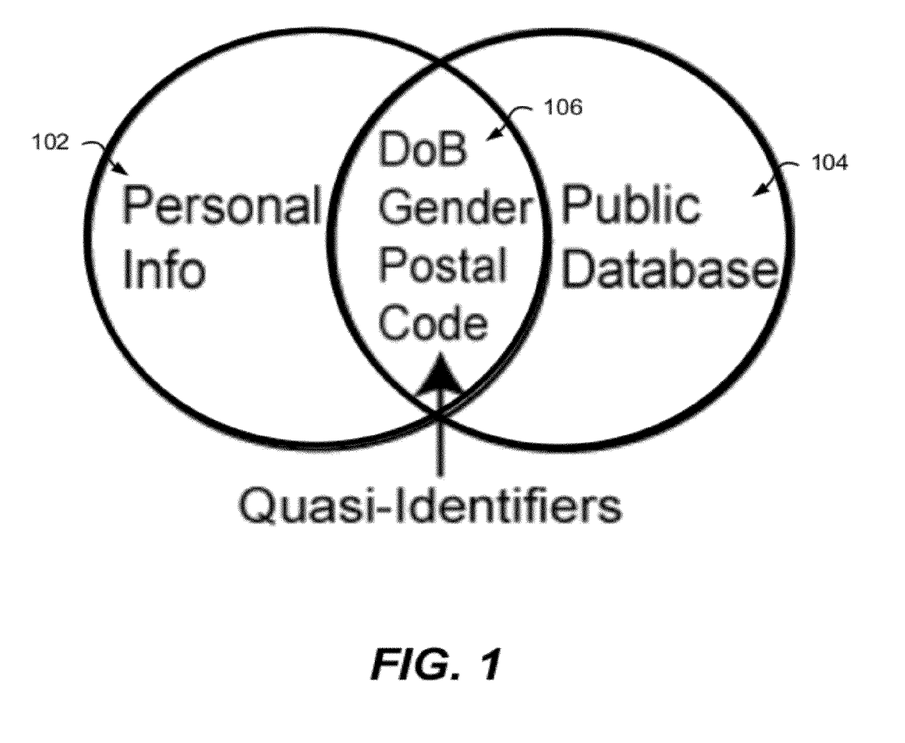
FIG. 1 shows a representation of example dataset quasi-identifiers.
Figure 2:
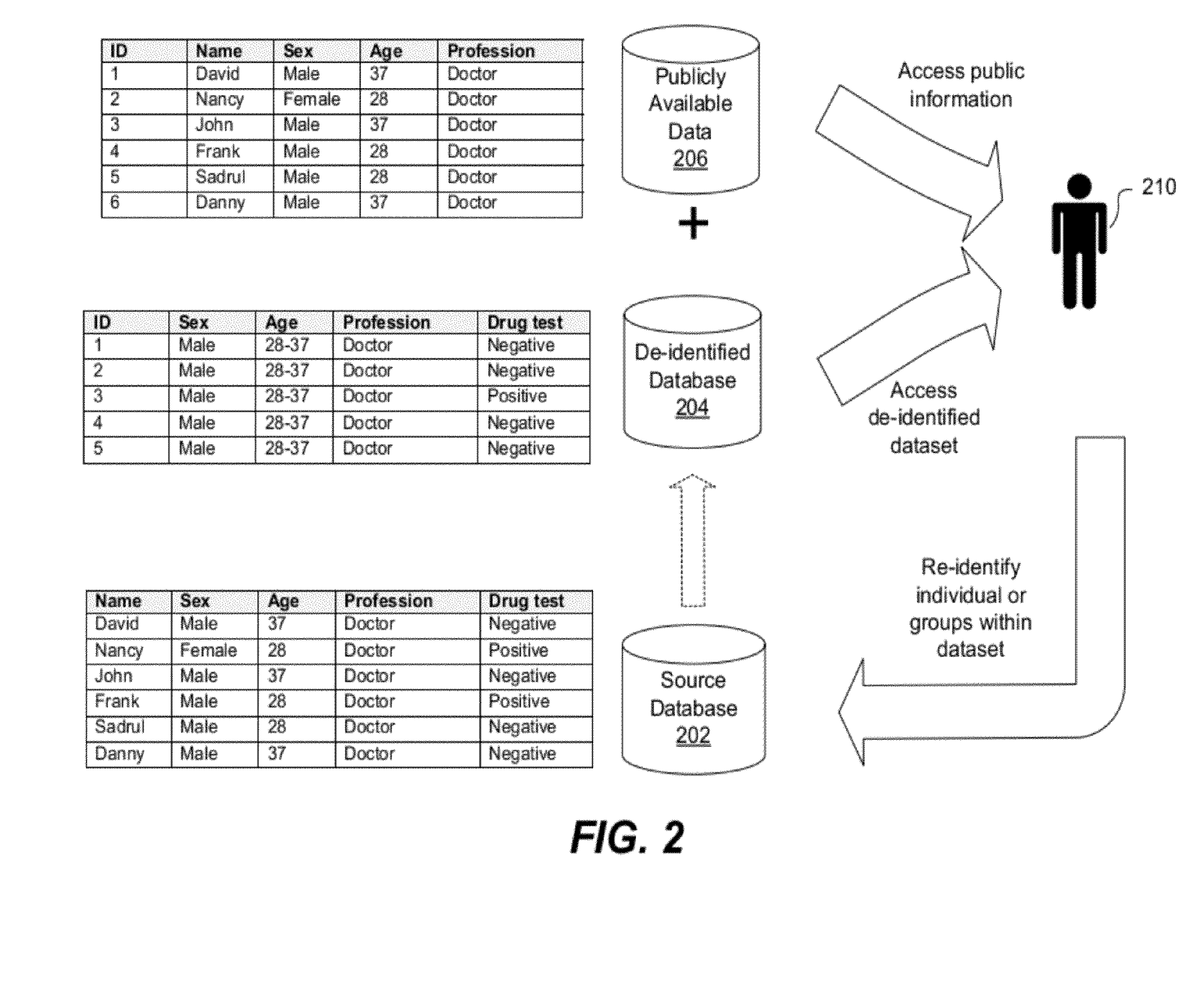
FIG. 2 shows a representation of dataset attack.

As shown in FIG. 1 re-identification can occur when personal information 102 related to quasi-identifiers 106 in a dataset, such as date of birth, gender, postal code can be referenced against public data 104. As shown in FIG. 2, source database or dataset 202 is de-identified using anonymization techniques such as k-anonymity, to produce a de-identified database or dataset 204 where potentially identifying information is removed or suppressed. Attackers 210 can then use publicly available data 206 to match records using quasi-identifiers present in the dataset re-identifying individuals in the source dataset 202. Anonymization and risk assessment can be performed to assess risk of re-identification by attack and perform further de-identification to reduce the probability of a successful attack.

A common attack is a 'prosecutor' attack uses background information about a specific individual to re-identify them. If the specific individual is rare or unique then they would be easier to re-identify. For example, a 120 years-old male who lives in particular region would be at a higher risk of re-identification given his rareness. To measure the risk from a prosecutor attack, the number of records that share the same quasi-identifiers (equivalence class) in the dataset is counted. Take the following dataset as an example:

| ID | Sex    | Age | Profession | Drug test |
|----|--------|-----|------------|-----------|
| 1  | Male   | 37  | Doctor     | Negative  |
| 2  | Female | 28  | Doctor     | Positive  |
| 3  | Male   | 37  | Doctor     | Negative  |
| 4  | Male   | 28  | Doctor     | Positive  |
| 5  | Male   | 28  | Doctor     | Negative  |
| 6  | Male   | 37  | Doctor     | Negative  |

In this dataset there are three equivalence classes: 28 year-old male doctors (2), 37-year-old male doctors (3) and 28-year old female doctors (1).

If this dataset is exposed to a Prosecutor Attack, say an attacker is looking for David, a 37-year-old doctor, there are 3 doctors that match these quasi-identifiers so there is a 1/3 chance of re-identifying David's record. However, if an attacker were looking for Nancy, a 28-year-old female doctor, there would be a perfect match since only one record is in that equivalence class. The smallest equivalence class in a dataset will be the first point of a re-identification attack.

The number of records in the smallest equivalence class is known as the dataset's "k" value. The higher k value a dataset has, the less vulnerable it is to a Prosecutor Attack. When releasing data to the public, a k value of 5 is often used. To de-identify the example dataset to have a k value of 5, the female doctor would have to be removed and age generalized.

| ID | Sex    | Age   | Profession | Drug test |
|----|--------|-------|------------|-----------|
| 1  | Male   | 28-37 | Doctor     | Negative  |
| 2  | ~~Female~~ | ~~28~~ | ~~Doctor~~ | ~~Positive~~ |
| 3  | Male   | 28-37 | Doctor     | Negative  |
| 4  | Male   | 28-37 | Doctor     | Positive  |
| 5  | Male   | 28-37 | Doctor     | Negative  |
| 6  | Male   | 28-37 | Doctor     | Negative  |

As shown by this example, the higher the k-value the more information loss occurs during de-identification. The process of de-identifying data to meet a given k-value is known as "k-anonymity". The use of k-anonymity to defend against a Prosecutor Attack has been extensively studied.

A Journalist Attack involves the use of an "identification database" to re-identify individuals in a de-identified dataset. An identification database contains both identifying and quasi-identifying variables. The records found in the de-identified dataset are a subset of the identification database (excluding the identifying variables). An example of an identification database would be a driver registry or a professional's membership list.

A Journalist Attack will attempt to match records in the identification database with those in a dataset. Using the previous Prosecutor Attack example:

| ID | Sex    | Age | Profession | Drug test |
|----|--------|-----|------------|-----------|
| 1  | Male   | 37  | Doctor     | Negative  |
| 2  | Female | 28  | Doctor     | Positive  |
| 3  | Male   | 37  | Doctor     | Negative  |
| 4  | Male   | 28  | Doctor     | Positive  |

-continued

| ID | Sex  | Age | Profession | Drug test |
|----|------|-----|------------|-----------|
| 5  | Male | 28  | Doctor     | Negative  |
| 6  | Male | 37  | Doctor     | Negative  |

It was shown that the 28-year-old female doctor is at most risk of a Prosecutor Attack. This record can be matched using the following identification database.

| ID | Name  | Sex    | Age | Profession |
|----|-------|--------|-----|------------|
| 1  | David | Male   | 37  | Doctor     |
| 2  | Nancy | Female | 28  | Doctor     |
| 3  | John  | Male   | 37  | Doctor     |
| 4  | Frank | Male   | 28  | Doctor     |
| 5  | Sadrul| Male   | 28  | Doctor     |
| 6  | Danny | Male   | 37  | Doctor     |
| 7  | Jacky | Female | 28  | Doctor     |
| 8  | Lucy  | Female | 28  | Doctor     |
| 9  | Kyla  | Female | 28  | Doctor     |
| 10 | Sonia | Female | 28  | Doctor     |

Linking the 28-year-old female with the identification database will result in 5 possible matches (1 in 5 chance of re-identifying the record).

To protect against a Journalist Attack, a "k-Map" can used developed. k-Map finds the smallest equivalence class in the identification database that maps to the de-identified dataset (map done on equivalence class). This equivalence class is most at risk for a Journalist Attack.

As shown in FIG. 3, the first table 310 is the original dataset or database before de-identification containing personal information which is associated with the stored data. The records in the original database are a subset of those found in the identification database (Z) 330. The identification database may comprise any form of publicly available record that may be used to re-identify records. An attempt to de-identify the dataset is made (ζ) by removing names and aggregating the year of birth by decade (decade of birth) as shown in de-identified dataset table 320. There are now five equivalence classes in the de-identified table that map to the identification dataset 330. This

| Equivalence class | | Anonymized table | | Public database | |
|--------|-----------|-------|--------|-------|----------------|
| Gender | Age       | Count | Id     | Count | ID             |
| Male   | 1950-1959 | 3     | 1, 4, 12 | 4   | 1, 4, 12, 27   |
| Male   | 1960-1969 | 2     | 2, 14  | 5     | 2, 14, 15, 22, 26 |
| Male   | 1970-1979 | 2     | 9, 10  | 5     | 9, 10, 16, 20, 23 |
| Female | 1960-1969 | 2     | 7, 11  | 5     | 7, 11, 18, 19, 21 |
| Female | 1970-1979 | 2     | 6, 13  | 5     | 6, 13, 17, 24, 25 | table shows that the smallest equivalence class in the identification database (Z) 330 that map to the de-identified dataset (ζ) 320 is a male born in the 1950s (four records). This is the equivalence class most at risk for a Linking Attack. Therefore, there is a one in four chance (25%) of re-identifying a record that falls in this equivalence class.

When de-identifying using k-map, records in the dataset that map to an equivalence class in the identification database that is smaller than the required k value (i.e. smaller than 5 records) must be suppressed or further generalized (males born between 1950-1959 in this example).

The problem with k-map is that identification database (Z) 330 is rarely available (due to cost, logistics) and cannot be used in the de-identification process. To overcome this limitation, a statistical process is provided that will model the identification database in order to de-identify data using k-map.

Figure 4:
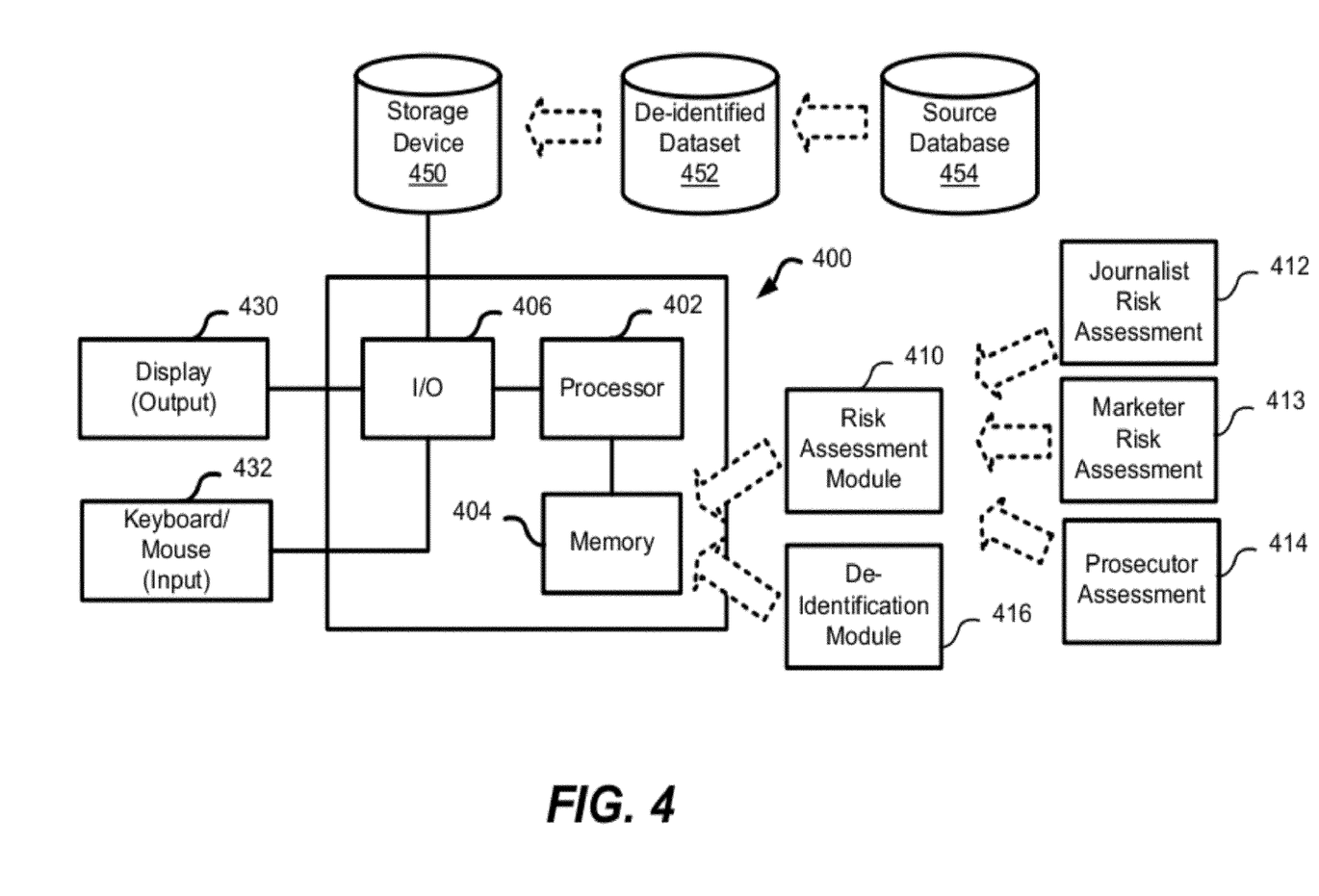
FIG. 4 shows a system for performing risk assessment.

FIG. 4 shows a system for performing risk assessment of a de-identified dataset. The system 400 is executed on a computer comprising a processor 402, memory 404, and input/output interface 406. The memory 404 executes instruction for providing a risk assessment module 410 which performs an assessment of journalist risk 412, marketer risk 413, and/or prosecutor risk 414. The risk assessment may also include a de-identification module 416 for performing further de-identification of the database or dataset based upon the assessed risk. A storage device 450, either connected directly to the system 400 or accessed through a network (not shown) stored the de-identified dataset 452 and possibly the source database 454 (from which the dataset is derived) if de-identification is being performed by the system. A display device 430 allows the user to access data and execute the risk assessment process. Input devices such as keyboard and/or mouse provide user input to the I/O module 406. The user input enables selection of desired parameters utilized in performing risk assessment. The instructions for performing the risk assessment may be provided on a computer readable memory. The computer readable memory may be external or internal to the system 400 and provided by any type of memory such as read-only memory (ROM) or random access memory (RAM). The databases may be provided by a storage device such compact disc (CD), digital versatile disc (DVD), non-volatile storage such as a harddrive, USB flash memory or external networked storage.

Figure 5:
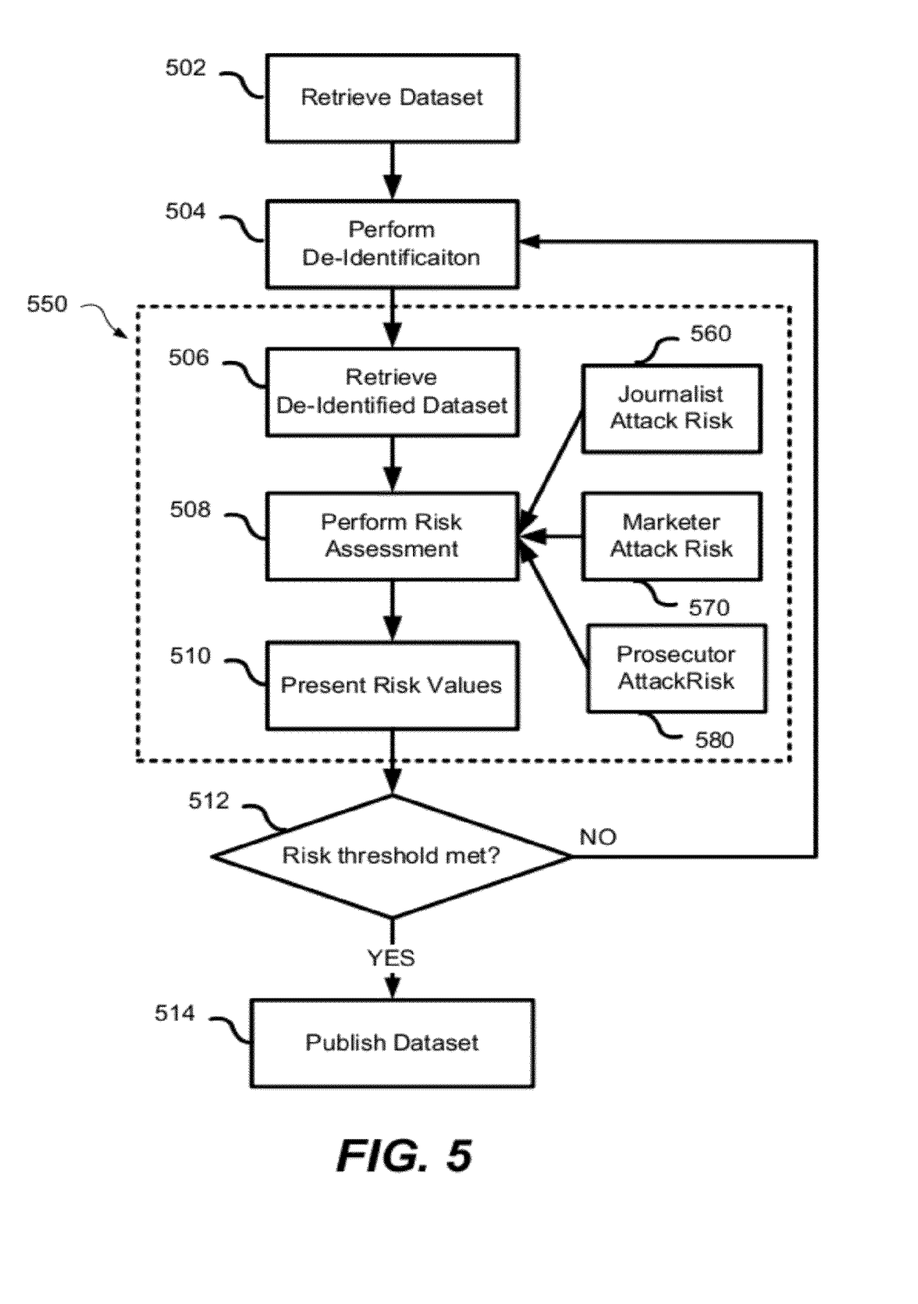
FIG. 5 shows a method for assessing risk and de-identification.

FIG. 5 shows a method of performing risk assessment and dataset de-identification as performed by system 400. If de-identification is performed as part of the method, the dataset is retrieved 502 and de-identification 504 is performed based upon user selections to remove acceptable identification information while attempting to minimize data loss in relation to the overall value of the database. The de-identified database is retrieved 506 from the storage device 450. Risk assessment is then performed 508 to assess Journalist Attack Risk 560 (as described in FIG. 6), Marketer Attack Risk 570 (as described in FIG. 7), and Prosecutor Attack Risk 580. The assessed risk values can be presented 510 to the user as for example shown in FIG. 9. If the risk desired risk threshold is not exceeded, YES at 512, the de-identified database can be published 514. If the threshold is exceeded, NO at 512, the dataset can be further de-identified at 504. If de-identification is not performed by the system, a sub-set of the method 550 can be performed independently of the de-identification process.

Journalist Attack Risk Assessment Process

Figure 6:
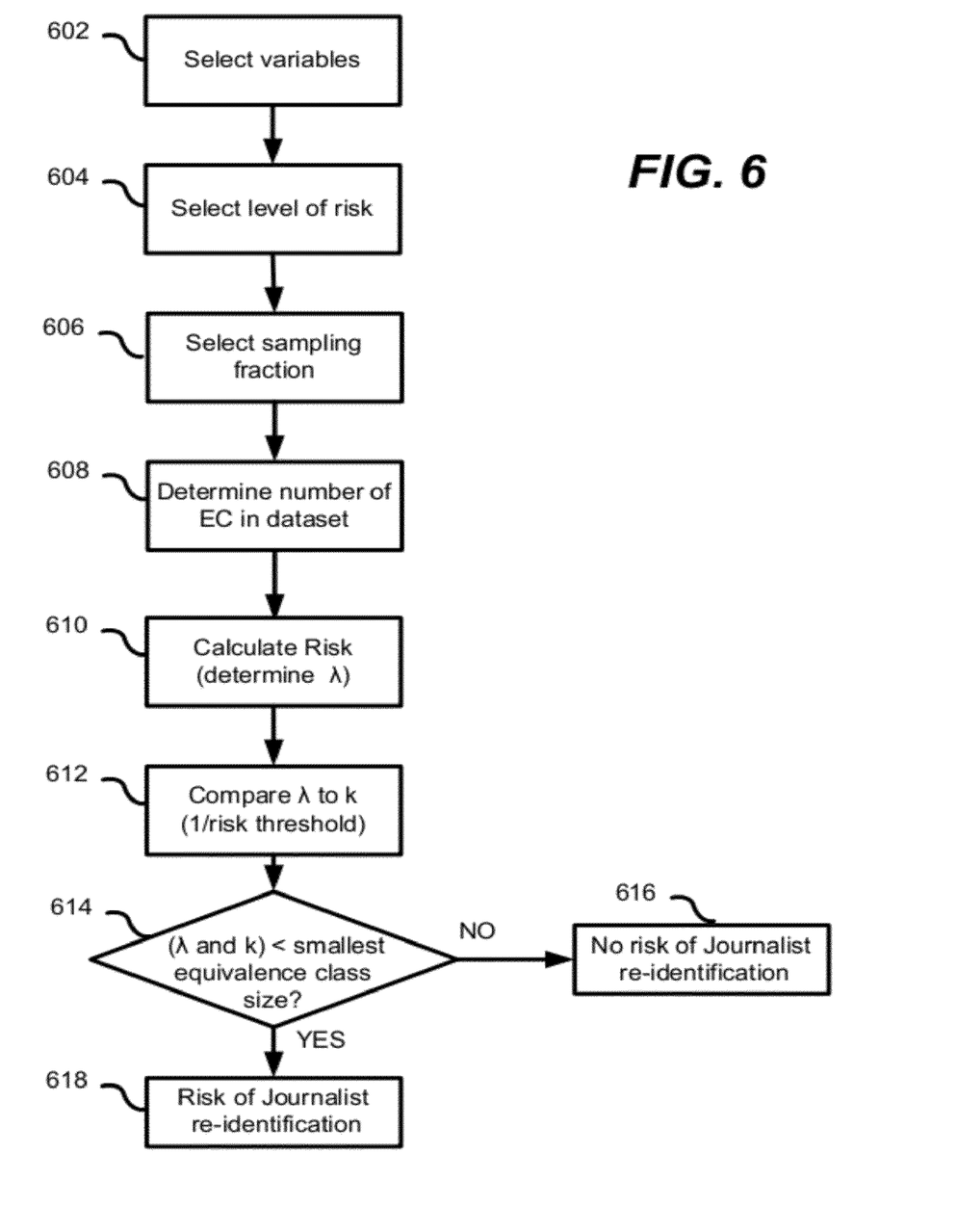
FIG. 6 shows a method of assessing risk for a journalist attack.
Figure 8:
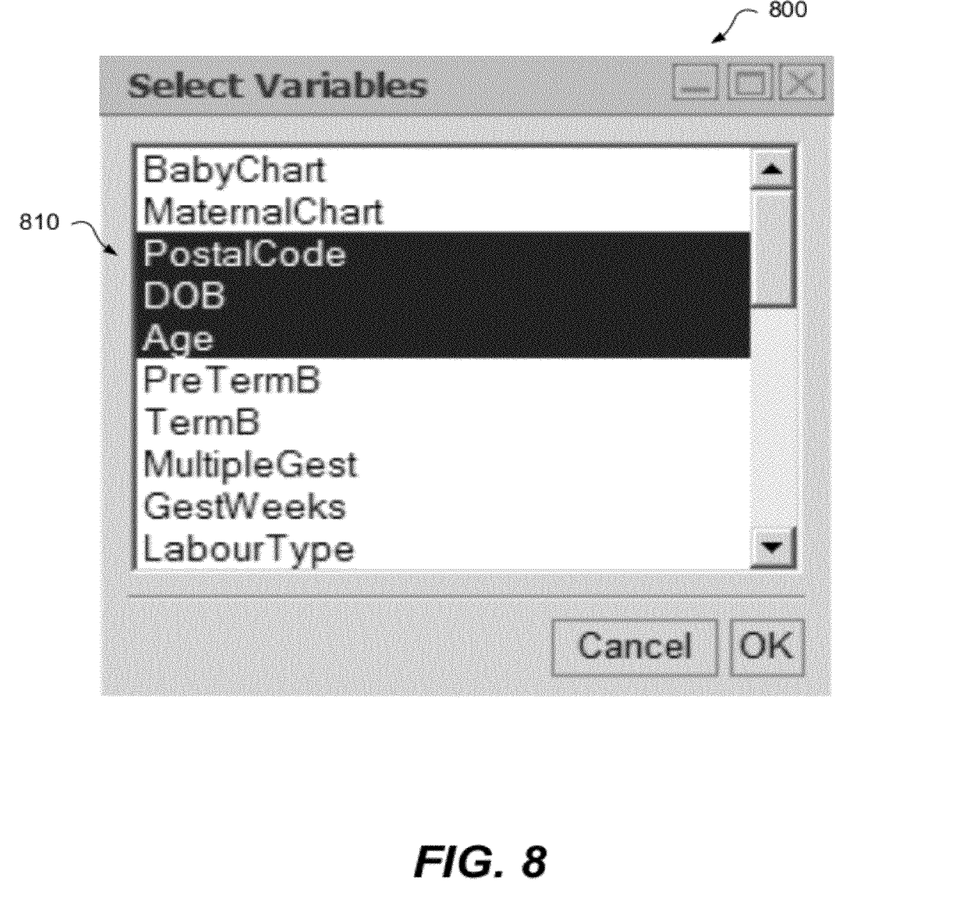
FIG. 8 shows variable selection.

FIG. 6 shows a method for determining Journalist Attack risk assessment. At 602 the variables in the database to be disclosed that are at risk of re-identification are received as input from the user during execution of the application. The user may select variables present in the database such as shown in FIG. 8, where a window 800 provides a list of variables 810 which as selected for assessment. Examples of potentially risky variables include dates of birth, location information and profession.

Figure 9:
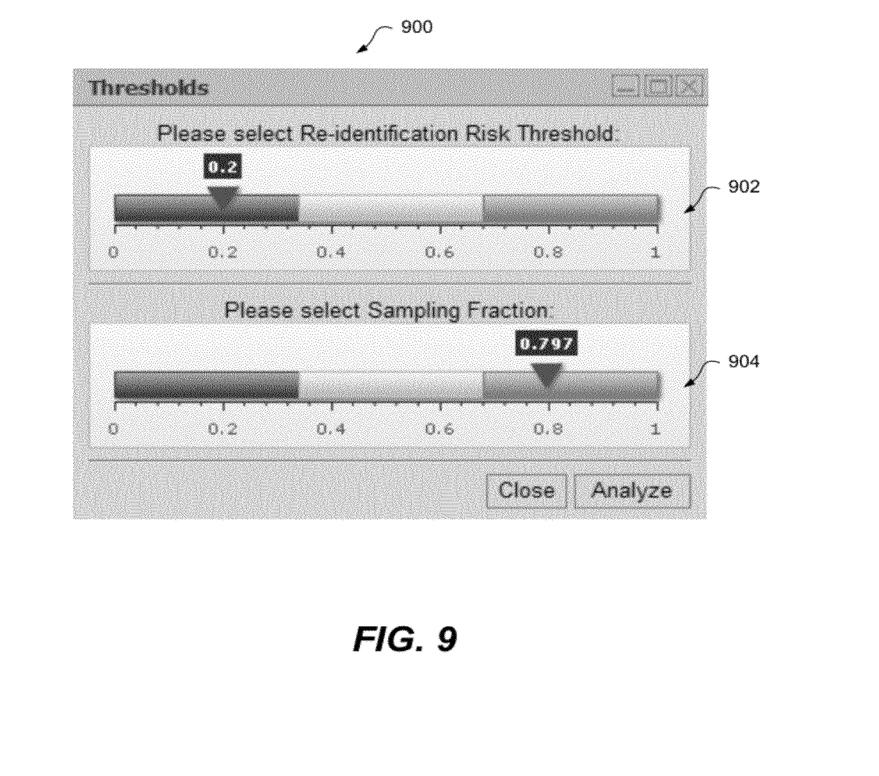
FIG. 9 shows threshold selection.

At 604 the user selects the acceptable risk threshold which is received by the system 400, as shown in FIG. 9. The risk threshold 902 measures the chance of re-identifying a record. For example, a risk threshold of 0.2 indicates that there is a 1 in 5 chance of re-identifying a record. The user also indicates the relative size of their dataset to the entire population (sampling fraction) at 606. For example, a sampling fraction of 0.3 indicates that the dataset represents 30% of the entire population. The user input can be provided by data loaded in a predefined template file or by direct user input through a graphical user interface or by direct data entry or a relative position such as a slider as shown.

At 608 the number of equivalent classes for each of the selected variable is determined. At 610 it can now be determined if the dataset is at risk of a Journalist Attack for the given threshold using the following:

k=1/risk threshold

μ=sampling fraction/risk threshold expmuo=exp(−$\mu_o$)

seqv=size of the smallest equivalence class in the dataset

The following equation is computed with an increasing index λ, starting at 1 and increment by 1, until Value is greater than or equal to 0.1:

Value=[exp$muo$*power($\mu_o$,λ)]/[λ!*(1−exp$muo$)]

Figure 10:
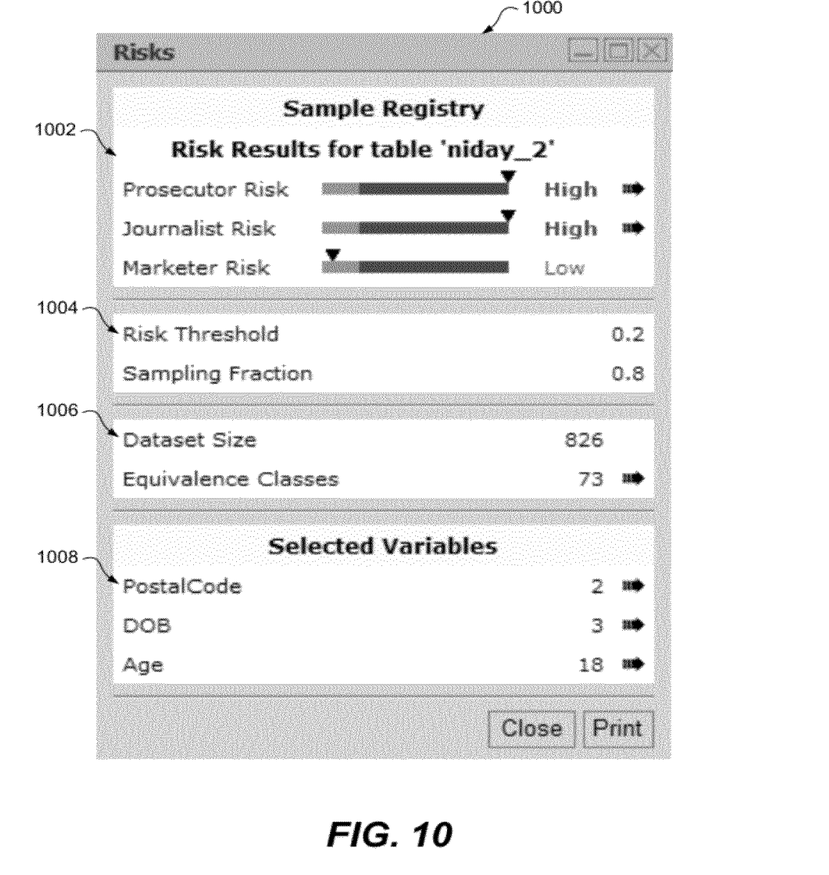
FIG. 10 shows a result view after performing a risk assessment.

At 612 the value of λ is compared with k. If smallest of these two values is less than seqv (smallest equivalence class size), YES at 614, then the dataset it at risk of a Journalist re-identification attack. If the smallest of the two values is greater than seqv, NO at 614, then the database is not at risk of re-identification 616. The result is displayed on a bar graph as shown in FIG. 10 as described below.

Alternatively, this approach may be described in relation to a Poisson distribution. If λ is a random variable indicating the number of times that a particular event has occurred, and $\mu_o$ be the expected number of occurrences for that event, then λ has a Poisson distribution with a parameter $\mu_o$>0 if:

$$P(\lambda = i \mid \mu_0) = \frac{\exp(-\mu_0)\mu_0^i}{i!}$$

where $\mu_o$ is the mean of the distribution. If it is not possible to have zero events, then a truncated at zero is a better representation.

$$P(\lambda=0 \mid \mu_o)=\exp(-\mu_o)$$

and:

$$P(\lambda>0 \mid \mu_o)=1-\exp(-\mu_o)$$

The conditional probability of observing λ events given that λ>0 is:

$$P(\lambda = i \mid \lambda > 0, \mu_0) = \frac{\exp(-\mu_0)\mu_0^i}{i!(1-\exp(-\mu_0))}$$

Let the discrete variable formed by cross-classifying all values on the quasi-identifiers in ζ can take on J distinct values. Let $X_{\zeta,i}$ denote the value of a record 0 in the ζ data set. For example, if there are two quasi-identifiers, such as gender and age, then $X_{\zeta,1}$="MALE, 50" $X_{\zeta,1}$="MALE, 53" may be present and so on. Similarly let $X_{Zj}$ denote the value of record i in the Z data set.

The sizes of the different equivalence classes are given by $$f_j = \sum_{i \in s'} I(X_{\zeta,i} = j),$$

j=1, . . . , J, where $f_j$ is the size of a ζ equivalence class and I(•) is the indicator function. Similarly $$F_j = \sum_{i \in U} I(X_{Z,i} = j),$$

j=1, . . . , J, where $F_j$ is the size of an equivalence class in Z.

In the case of k-map, determining if the size of any equivalence class in the identification database, Z, is greater than k, and $F_j \geq k$ is desired. The minimum number of records, k' is required, so that an equivalence class in ζ can take: $f_j \geq k'$ should guarantee with a high probability that $F_j \geq k$. For that, let the sampling fraction for the whole data set be denoted by |s'|/|U|=p, then the expectation for the size of an equivalence class in the anonymized data set ζ is $pF_j = \mu_j \cdot \mu_j \geq pk$ can then be formulated. Let $\mu_o$=pk (in other words, $\mu_o$ is the minimum expected number of records of an equivalence class of ζ for which the corresponding equivalence class in Z has more than k records), then the null can be expressed as $H_0$: $\mu_j < \mu_o$. If $H_0$ is rejected at a specified significance level α then it can conclude that $F_j \geq k$.

If it is assumed that $f_j$ is Poisson distributed, then under the null distribution the probability of an equivalence class of size Q or larger in the data set ζ is given by:

$$1 - \sum_{\lambda=0}^{Q-1} \frac{\exp(-\mu_0)\mu_0^\lambda}{\lambda!}.$$

Now, the size k' of an equivalence class in the data set ζ that rejects the null hypothesis is determined. k' is the smallest value of Q that satisfies the following inequality:

$$\left(1 - \sum_{\lambda=0}^{Q-1} \frac{\exp(-\mu_0)\mu_0^\lambda}{\lambda!}\right) < \alpha$$

A value of α of 0.1, is chosen, which is slightly larger than the more common α-level of 0.05, because the mean of the Poisson distribution ($\mu_o$) will be small for small values of k, resulting in reduced statistical power. The larger α value provides some compensation for that loss in power of the hypothesis test.

In practice equivalence classes that do not appear in the data set are not of interest. Rather the focus is only on the equivalence classes that do appear in the data set, then $f_j$ is best represented as a truncated-at-zero Poisson distribution. The value of k' under that condition is the smallest value of Q that satisfies the following inequality:

$$\left(1 - \sum_{\lambda=1}^{Q-1} \frac{\exp(-\mu_0)\mu_0^\lambda}{\lambda!(1-\exp(-\mu_0))}\right) < \alpha$$

Because in reality the size of equivalence classes in the data set cannot exceed the size of the equivalence classes in the identification database, the appropriate equivalence class size to use in the optimization algorithm is the minimum of k' and the desired value for k-map: min(k',k).

Marketer Attack

In a Journalist Attack, an intruder uses the smallest equivalence class in an identification database that maps to the de-identified database as their point of attack. This approach has the highest chance of properly re-identifying a single person. However, there are scenarios where the purpose of the attack is to link as many records as possible in the de-identified dataset with those in the identification database. The attacker is not concerned if some of the records are incorrectly linked. Take for example a pharmaceutical marketing company that obtained de-identified prescription data. They can attempt to match this dataset with their internal marketing database to create a mailing campaign (targeting doctors). They are not concerned if some of the mailers are sent to the wrong physicians (i.e., spam).

The risk of a Marketer Attack is measured by calculating the probability of matching a record in an equivalence class of the de-identified dataset with those in the matching equivalence class in the identification database. In the previous example (see above), the first equivalence class (males ages 1950-1959) has three records that could be matched to one of four possible records in the public database. The expected number of records that an intruder can properly identify when randomly matching records in the de-identified dataset with those in the public database can be calculated for each equivalence class.

Figure 7:
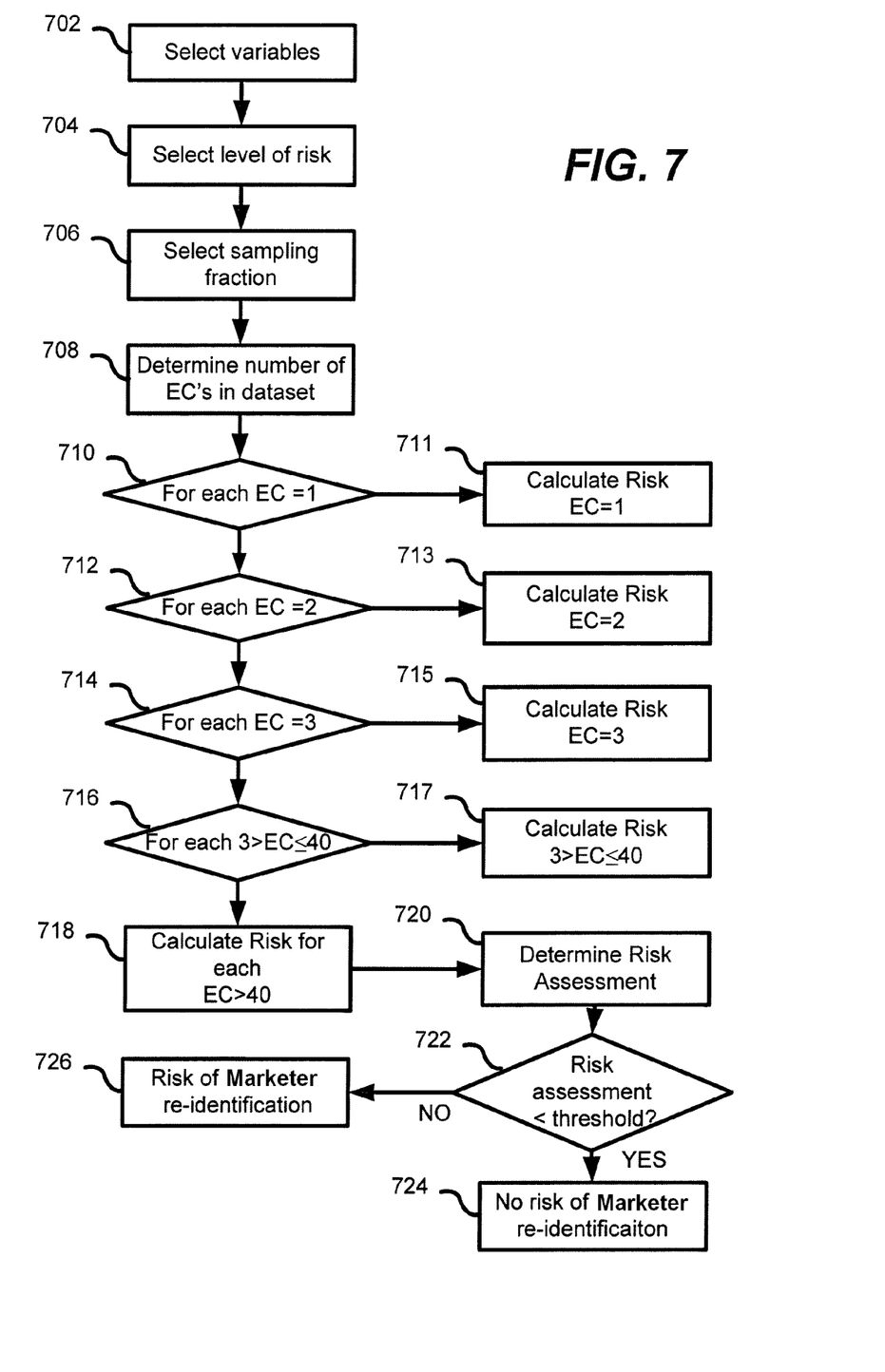
FIG. 7 shows a method for assessing risk for a marketer attack.

For example, a risk threshold of 0.2 indicates that there is a 1 in 5 chance of re-identifying a record. The user also indicates the relative size of their dataset to the entire population (sampling fraction) at 706. For example, a sampling fraction of 0.3 indicates that the dataset represents 30% of the entire population. The user input can be provided by data loaded in a predefined template file or by direct user input through a graphical user interface by direct entry or a relative position such as a slider as shown.

At 708 the number of equivalent classes for each of the selected variables is determined. It can now be determined if the dataset is at risk of a Marketer Attack for the given threshold by iterating through all the equivalence classes in the dataset and compute the following (Result is set to zero at the start):

If the size of the equivalence class in the de-identified dataset is 1, at 710, the result is calculated at 711 where:

Result+=sampling fraction*Log(1.0/sampling fraction)/(1−sampling fraction)

If the size of the equivalence class is 2, at 712, the result is calculated at 713 where:

$pbyq$=sampling fraction/(1−sampling fraction)

Result+=2*[$pbyq$−(($pbyq$*$pbyq$)*Log(1.0/sampling fraction))]

If the size of the equivalence class is 3, at 714, the result is calculated at 715, where:

$q$=(1−sampling fraction)

Result+=3*[sampling fraction*(($q$*(3*$q$−2))−(2*sampling fraction^2*Log(sampling fraction)))/(2*$q2$)]

| Equivalence class | | Anonymized table | | Public database | | Probability |
|---|---|---|---|---|---|---|
| Gender | Age | Count | Record number | Count | Record number | of match |
| Male | 1950-1959 | 3 | 1, 4, 12 | 4 | 1, 4, 12, 27 | 3/4 |
| Male | 1960-1969 | 2 | 2, 14 | 5 | 2, 14, 15, 22, 26 | 2/5 |
| Male | 1970-1979 | 2 | 9, 10 | 5 | 9, 10, 16, 20, 23 | 2/5 |
| Female | 1960-1969 | 2 | 7, 11 | 5 | 7, 11, 18, 19, 21 | 2/5 |
| Female | 1970-1979 | 2 | 6, 13 | 5 | 6, 13, 17, 24, 25 | 2/5 |
| | | Expected number of records of identified records | | | | 2.35 |

An intruder would expect to properly re-identify about 40% of the overall records in this scenario.

As described in the previously, the identification database is not often known and cannot be directly used to calculate the expected number of records that would be re-identified by a hit or miss linking attack. To overcome this limitation, we created a statistical process that will model the identification database in order to determine the expected number of records that would be re-identified in a dataset.

Marketer Attack Risk Assessment Process

FIG. 7 shows a method for the Marketer Attack risk assessment. At 702 the variables in the database to be disclosed that are at risk of re-identification are received as input from the user. The user may select variables present in the database such as shown in FIG. 8, where a window 800 provides a list of variables 810 which as selected for assessment. Examples of potentially risky variables include dates of birth, location information and profession.

At 704 the user selects the acceptable risk threshold, and is received by the system 400, as shown in FIG. 9. The risk threshold 902 measures the chance of re-identifying a record.

If the size of the equivalence class ($fj$) is less or equal to 40 but greater than 3, at 716, the result is calculated at 717, where:

$q$=(1−sampling fraction size)

Result+=$fj$*[(sampling fraction/$fj$)*(1.0+$q$/($fj$+1)+(4*$q2$)/(2*($fj$+1)*($fj$+2))+(36*$q3$)/(6*($fj$+1)*($fj$+2)*($fj$+3)))]

If the size of the equivalence class ($fj$) is greater than 40, the result is calculated at 718 where:

Result+=$fj$*[sampling fraction/($fj$−(1−sampling fraction))]

At 720, the Marketer Attack risk is determined by dividing Result by the number of records in the dataset. If the value is less than the selected user risk threshold, YES at 722, then the database is not at risk 724. If this value is less than the defined risk threshold, NO at 722, then the database it at risk of a marketer re-identification attack 726.

FIG. 10 shows a possible display of the risks values determined for the de-identified databases. The results for the determined Prosecutor, Journalist and Marketer Risk can be displayed 1002. The selected thresholds 1004 and sampling fraction in addition to the dataset size and the equivalence classes 1006 are displayed. Finally, the selected variables are displayed 1008.

The invention claimed is:

1. A method of performing risk assessment of a dataset from a source database containing information identifiable to individuals, the method executed by a computer processor comprising:
   retrieving the dataset comprising a plurality of records from a storage device;
   receiving a selection of variables from a user, the selection made from a plurality of variables present in the dataset, wherein the variables are identifiers that are associated with personal information to identify one or more individuals from the one or more of the plurality of records;
   receiving a selection of a risk threshold acceptable for the dataset from a user;
   receiving a selection of a sampling fraction wherein the sampling fraction defines a relative size of the dataset to an entire population represented by the source database;
   determining a number of records from the plurality of records in the dataset for each equivalence class for each of the selected variables present in the dataset;
   calculating a re-identification risk of one or more records of the dataset using the selected sampling fraction and the determined number of records for each equivalence class, wherein the re-identification risk is calculated by [expmuo*power($\mu_o$, $\lambda$)]/[$\lambda$!*(1−expmuo)] with an increasing index $\lambda$, starting at 1 and increment by 1, until the re-identification risk is greater than or equal to 0.1 where
   $\mu_o$=sampling fraction/risk threshold,
   expmuo=exp(−$\mu_o$),
   power($\mu_o$, $\lambda$)=$\mu_o^\lambda$, and
   seqv=size of the smallest equivalence class in the dataset;
   displaying the calculated re-identification risk relative to the selected risk threshold; and
   wherein the re-identification risk is defined as the risk of matching a record stored in the dataset with a record stored in a public database thereby providing identifying information of a person associated with the record.

2. The method of claim 1 wherein if a smallest value of $\lambda$ and k, where k is a number of records in the smallest equivalence class in the dataset, is less than the smallest equivalence class size (seqv) then the dataset is at risk of re-identification attack.

3. The method of claim 1 wherein if a smallest value of $\lambda$ and k, where k is a number of records in the smallest equivalence class in the dataset, is greater than the smallest equivalence class size (seqv) the dataset is not at risk of re-identification.

4. The method of claim 1 wherein the risk of re-identification is called Journalist Risk where identification of the one or more records of the dataset is performed by attempting to match records in the dataset against an identification database.

5. The method of claim 4 wherein the re-identification risk is defined as the risk of matching as many records as possible stored in the dataset with records stored in a public database thereby providing possible identifying information of persons associated with the records, but with lower possibility of an exact match.

6. The method of claim 5 wherein the calculating the re-identification risk further comprises for each equivalence class present in the dataset associated with the selected variables, calculating:
   If the size of the equivalence class is 1:

Result+=sampling fraction*Log(1.0/sampling fraction)/(1−sampling fraction)

If the size of the equivalence class is 2:

$pbyq$=sampling fraction/(1−sampling fraction); where

Result+=2*[$pbyq$−(($pbyq$*$pbyq$)*Log(1.0/sampling fraction))]

If the size of the equivalence class is 3:

$q$=(1−sampling fraction); where

Result+=3*[sampling fraction*(($q$*(3*$q$−2))−(2*sampling fraction^2*Log(sampling fraction)))/(2*$q$2)]

If the size of the equivalence class ($fj$) is less or equal to 40:

$q$=(1−sampling fraction size); where

Result+=$fj$*[(sampling fraction/$fj$)*(1.0+$q$/($fj$+1)+(4*$q$2)/(2*($fj$+1)*($fj$+2))+(36*$q$3)/(6*($fj$+1)*($fj$+2)*($fj$+3)))]

If the size of the equivalence class ($fj$) is greater than 40:

Result+=$fj$*[sampling fraction/($fj$−(1−sampling fraction))]

wherein a value of the variable Result is a sum of all calculated Result values for each of the equivalence classes and the identification risk is determined by dividing Result value by the number of records in the dataset.

7. The method of claim 6 wherein if the determined identification risk is less than the selected user risk threshold the dataset is not at risk of re-identification.

8. The method of claim 6 wherein if the determined identification risk is greater than the risk threshold selection then the database it at risk of re-identification.

9. The method of claim 1 further comprising performing de-identification on the dataset, the de-identification process generating equivalence classes in the dataset to remove data which may enable re-identification of individual records until the determined identification risk is less than the selected user risk.

10. A system for performing risk assessment of a data set, from a source database containing information identifiable to individuals, the system comprising:
   a processor;
   a memory containing instructions for execution by the processor, the instructions comprising:
   retrieving the dataset comprising a plurality of records from a storage device;
   receiving a selection of variables from a user, the selection made from a plurality of variables present in the dataset, wherein the variables are identifiers that are associated with personal information to identify one or more individuals from the one or more of the plurality of records;
   receiving a selection of a risk threshold acceptable for the dataset from a user;
   receiving a selection of a sampling fraction wherein the sampling fraction defines a relative size of the dataset to an entire population represented by the source database;
   determining a number of records from the plurality of records in the dataset for each equivalence class for each of the selected variables present in the dataset;

calculating a re-identification risk of one or more records of the dataset using the selected sampling fraction and the determined number of records for each equivalence class wherein the re-identification risk is calculated by [expmuo*power($\mu_o$, $\lambda$)]/[$\lambda$!*(1−expmuo)] with an increasing index $\lambda$, starting at 1 and increment by 1, until the re-identification risk is greater than or equal to 0.1 where $\mu_o$=sampling fraction/risk threshold, expmuo=exp(−$\mu_o$), power($\mu_o$, $\lambda$)=$\mu_o^\lambda$, and seqv=size of the smallest equivalence class in the dataset;

displaying the calculated re-identification risk relative to the selected risk threshold; and wherein the re-identification risk is defined as the risk of matching a record stored in the dataset with a record stored in a public database thereby providing identifying information of a person associated with the record.

11. The system of claim 10 wherein if a smallest value of $\lambda$ and k, where k is a number of records in the smallest equivalence class in the dataset, is less than the smallest equivalence class size (seqv) then the dataset is at risk of re-identification attack.

12. The system of claim 10 wherein if a smallest value of $\lambda$ and k, where k is a number of records in the smallest equivalence class in the dataset, is greater than the smallest equivalence class size (seqv) the dataset is not at risk of re-identification.

13. The system of claim 10 wherein the calculating the re-identification risk further comprises for each equivalence class present in the dataset associated with the selected variables, calculating:

If the size of the equivalence class is 1:

Result+=sampling fraction*Log(1.0/sampling fraction)/(1−sampling fraction)

If the size of the equivalence class is 2:

$pbyq$=sampling fraction/(1−sampling fraction); where

Result+=2*[$pbyq$−(($pbyq$*$pbyq$)*Log(1.0/sampling fraction))]

If the size of the equivalence class is 3:

$q$=(1−sampling fraction); where

Result+=3*[sampling fraction*(($q$*(3*$q$−2))−(2*sampling fraction^2*Log(sampling fraction)))/(2*$q$2)]

If the size of the equivalence class (fj) is less or equal to 40:

$q$=(1−sampling fraction size); where

Result+=$fj$*[(sampling fraction/$fj$)*(1.0+$q$/($fj$+1)+(4*$q$2)/(2*($fj$+1)*($fj$+2))+(36*$q$3)/(6*($fj$+1)*($fj$+2)*($fj$+3)))]

If the size of the equivalence class (fj) is greater than 40:

Result+=$fj$*[sampling fraction/($fj$−(1−sampling fraction))]

wherein a value of the variable Result is a sum of all calculated Result values for each of the equivalence classes and the identification risk is determined by dividing Result value by the number of records in the dataset.

14. The system of claim 13 wherein if the determined identification risk is less than the selected user risk threshold the dataset is not at risk of re-identification.

15. The system of claim 13 wherein if the determined identification risk is greater than the risk threshold selection then the database is at risk of re-identification.

16. The system of claim 10 wherein the risk of re-identification is called Journalist Risk where identification of the one or more records of the dataset is performed by attempting to match records in the dataset against an identification database.

17. The system of claim 16 further comprising performing de-identification on the dataset, the de-identification process generating equivalence classes in the dataset to remove data which may enable re-identification of individual records until the determined identification risk is less than the selected user risk.

18. A non-transitory computer readable storage medium containing instructions for execution on a processor, the instructions for performing risk assessment of a dataset, from a source database containing information identifiable to individuals, the instructions comprising:

retrieving the dataset comprising a plurality of records from a storage device;

receiving a selection of variables from a user, the selection made from a plurality of variables present in the dataset, wherein the variables are identifiers that are associated with personal information to identify one or more individuals from the one or more of the plurality of records;

receiving a selection of a risk threshold acceptable for the dataset from a user;

receiving a selection of a sampling fraction wherein the sampling fraction defines a relative size of the dataset to an entire population represented by the source database;

determining a number of records from the plurality of records in the dataset for each equivalence class for each of the selected variables present in the dataset;

calculating a re-identification risk of one or more records of the dataset using the selected sampling fraction and the determined number of records for each equivalence class, wherein the re-identification risk is calculated by [expmuo*power($\mu_o$, $\lambda$)]/[$\lambda$!*(1−expmuo)] with an increasing index $\lambda$, starting at 1 and increment by 1, until the re-identification risk is greater than or equal to 0.1 where)

$\mu_o$=sampling fraction/risk threshold, expmuo=exp(−$\mu_o$), power($\mu_o$, $\lambda$)=$\mu_o^\lambda$, and seqv=size of the smallest equivalence class in the dataset;

displaying the calculated re-identification risk relative to the selected risk threshold; and wherein the re-identification risk is defined as the risk of matching a record stored in the dataset with a record stored in a public database thereby providing identifying information of a person associated with the record.

* * * * *